W. U. HOOVER.
Cultivator.
No. 84,946.
Patented Dec. 15, 1868.
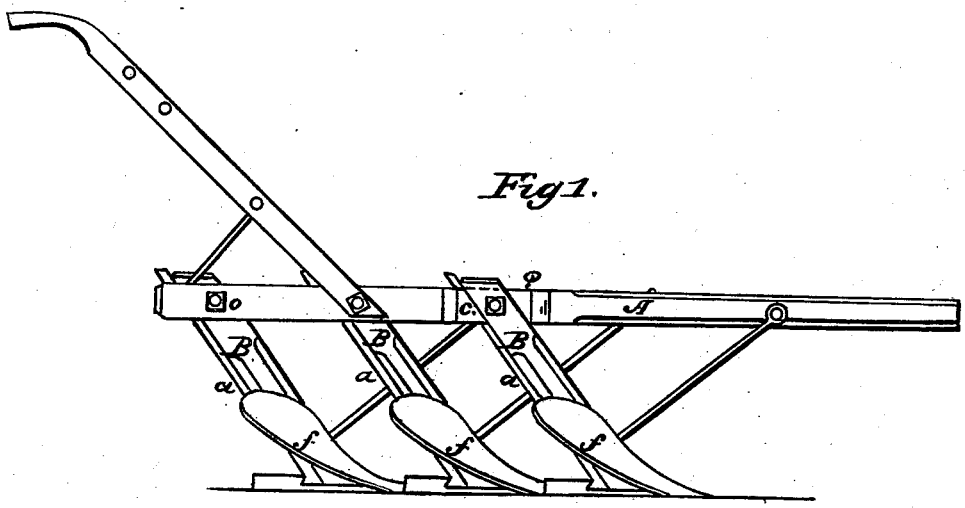
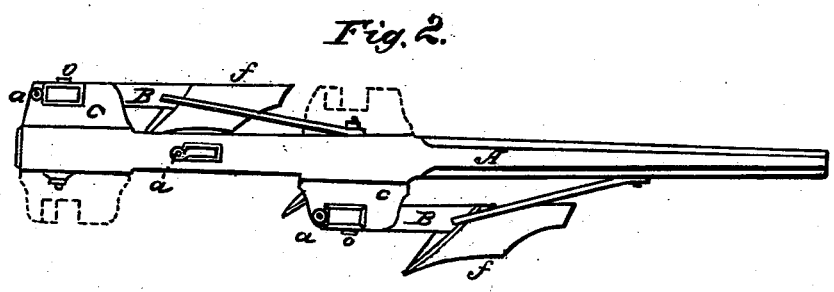

UNITED STATES PATENT OFFICE.

W. UPTON HOOVER, OF DAYSVILLE, KENTUCKY.

IMPROVEMENT IN PLOWS.

Specification forming part of Letters Patent No. 84,946, dated December 15, 1868.

*To all whom it may concern:*

Be it known that I, W. UPTON HOOVER, of Daysville, in the county of Todd and State of Kentucky, have invented certain new and useful Improvements in Plows; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to plows, and consists in a novel construction of the implement, whereby it is adapted for use in preparing the ground for the reception of the seed, in planting seeds of various kinds, and in cultivating growing crops, as hereinafter explained.

Figure 1 is a side elevation, and Fig. 2 is a top plan view, with the handles omitted.

In the practice of farming as generally conducted it is customary to use one kind of plow for preparing the soil, then a seeding-machine for planting or sowing the seed, and finally a still different implement for cultivating the growing crop.

The object of my invention is to produce an implement that may be used for all these various purposes, and thus effect a great saving to the farming community.

In constructing my improved plow I provide a beam, A, to which I attach three regularly-formed plows, these plows being in form and style the same as the ordinary farm-plow, but much narrower, and somewhat smaller otherwise. These plows *f* are secured to the lower end of standards B, the upper ends of which are secured to the beam A in the manner represented in the drawings—that is to say, the central one is framed into the beam, while the other two, one in front and the other in rear, being framed into the side of a block, *c*, which, with the standard B, is secured to the sides of the beam A by means of a bolt, *o*, as represented in Figs. 1 and 2. These blocks *c* are placed on opposite sides of the beam, the front one being secured on the right-hand side and the rear one on the left, as represented in Fig. 2, by which means the plows are so located that each succeeding one of the series will turn its slice into the furrow-bed formed by its predecessor, as is necessary in ordinary plowing.

In rear of each of the standards B a tube, *a*, is secured, as shown in Fig. 1, these tubes being intended to convey the seed to the furrow when the implement is to be used as a planter, in which case any suitable style of seeding mechanism is to be mounted upon the beam in such a manner as to be operated by hand or otherwise, and deliver the seed to the tubes *a* in suitable quantities. In some cases I propose to dispense with the tubes, and use a broadcast seeding mechanism so arranged as to deliver the seed in front of the plows if it be desired to plow it in, or in rear of them if it be desired to cover it by other means—as, for instance, with a harrow. For these purposes any suitable seeding mechanism may be adopted, the seeding devices forming no part of my present invention.

By reversing the position of the two side plows, as represented by the red lines in Fig. 2, in which case the front plow is brought to the rear and the rear one to the front, it will be seen that a very thorough and effectual stirring and pulverizing of the soil will be accomplished, as in that case each succeeding plow will not only turn its own furrow, but at the same time will also move a portion or all of the furrow-slice thrown up by its predecessor. This arrangement is specially beneficial in cultivating growing crops, and also in fall-plowing, and in preparing stubble-ground for the reception of seed for another crop.

By using these turn-plows for cultivating growing crops, instead of the usual cultivator-teeth, the weeds are far more effectually destroyed, because by turning the furrow over they are not only dug up, as with the cultivator-tooth, but they are effectually buried or covered with earth.

It is obvious that the plows *f* may be made so as to turn the furrow either to the right or to the left, as may be desired; or, if preferred, when used as a cultivator one of each kind may be used at the sides, and by changing these the earth may be thrown from the center of the row outward toward the growing plants, or inward from the plants, as may be desired.

By these simple means I produce an implement that is admirably suited to all these various purposes of plowing, planting, and cultivating, and which thus saves to the farmer a large portion of the capital usually invested in the different implements used for these purposes.

Having thus described my invention, what I claim is—

The combination of the three turn-plows $f$, when arranged in relation to each other and for adjustment in the manner shown and described.

W. UPTON HOOVER.

Witnesses:
P. A. LYON,
THOS. B. BAILEY.